United States Patent [19]

Creegan

[11] Patent Number: 5,110,635
[45] Date of Patent: May 5, 1992

[54] REUSABLE WREATH

[76] Inventor: Rosemarie A. Creegan, 1660 East Dr., Merrick, N.Y. 11566

[21] Appl. No.: 692,234

[22] Filed: Apr. 26, 1991

[51] Int. Cl.⁵ .............................................. A41G 1/00
[52] U.S. Cl. ...................................... 428/10; 428/100
[58] Field of Search ................... 428/10, 100, 27; 248/27.8; 156/63; 362/122; 493/957, 958

[56] References Cited

U.S. PATENT DOCUMENTS

| | | | |
|---|---|---|---|
| 2,761,233 | 9/1956 | Brown | 428/10 X |
| 3,647,604 | 3/1972 | Schoenherr et al. | 428/10 X |
| 3,819,458 | 6/1974 | Kinderman et al. | 428/10 |
| 4,100,316 | 7/1978 | Lackey | 428/10 |
| 4,673,599 | 6/1987 | Vanderslice | 428/10 |
| 4,678,150 | 7/1987 | Newman et al. | 428/100 X |
| 4,792,471 | 12/1988 | Lee | 428/100 X |
| 4,971,593 | 11/1990 | Mayhall et al. | 428/100 X |

FOREIGN PATENT DOCUMENTS 1027038  2/1953  France ................................ 428/10

*Primary Examiner*—Henry F. Epstein
*Attorney, Agent, or Firm*—Collard, Roe & Galgano

[57] ABSTRACT

A reusable wreath which allows easy attachment and detachment of accessories. A strip of VELCRO® is wound around the wreath base to permit easy arrangement and adjustment of accessories.

6 Claims, 1 Drawing Sheet

REUSABLE WREATH

BACKGROUND OF THE INVENTION

This invention relates to a reusable wreath which permits easy attachment and detachment of accessories. The wreath is intended to be used year round, with mere accessory changes, e.g., to accommodate changing seasons, holidays, months, etc.

Typically, a wreath is used for only one occasion, e.g., Christmas wreath. The wreath may be used annually, or it may be used only once and then discarded, for example, with a live evergreen wreath. The reason for such limited use is that typically the accessories are attached permanently or semi-permanently, e.g., wires that wrap around the wreath. It is difficult and time consuming to change these accessories. In addition, the wreath may deteriorate slightly each time the accessories are changed. As can be seen, wreaths have not been designed to withstand frequent accessory changes.

SUMMARY OF THE INVENTION

It is, therefore, an object of the present invention to eliminate the aforementioned drawbacks of the prior art and to provide a wreath which can be used year round.

It is a further object of the present invention to provide such a wreath which is inexpensive and provides for simple accessory changes.

It is yet a further object of the invention to provide a wreath which will withstand frequent accessory changes.

These and related objects are attained according to the invention by a reusable wreath. The wreath has a base, e.g., strands of vine, which can optionally be mounted on a frame if sufficient integrity is not provided by the base material itself, for example, cloth. The base is generally ring shaped and has strips of VELCRO ®, a hook and loop fastener, across the front of it. While the wreath has the hooks on it, for example, the accessories would have the loop part on the backs of them. In this way, the accessories can easily be placed on the front of the wreath by aligning the loop part on the back of the accessory with a strip of the hook part on the wreath and pressing the accessory into place. To remove an accessory, the item is simply pulled off the wreath base. This type of fastener allows for quick and easy modification when arranging a wreath and permits totally different accessories to be used during different seasons. Also, accessories which were made of cloth or other material could easily be washed, since there is no metal to rust, and the hook and loop fastener would not be affected.

BRIEF DESCRIPTION OF THE DRAWINGS

Other objects and features of the present invention will become apparent from the following detailed description considered in connection with the accompanying drawing which discloses one embodiment of the present invention. It should be understood, however, that the drawing is designed for the purpose of illustration only and not as a definition of the limits of the invention.

DETAILED DESCRIPTION OF THE PREFERRED EMBODIMENT

Figure 1:
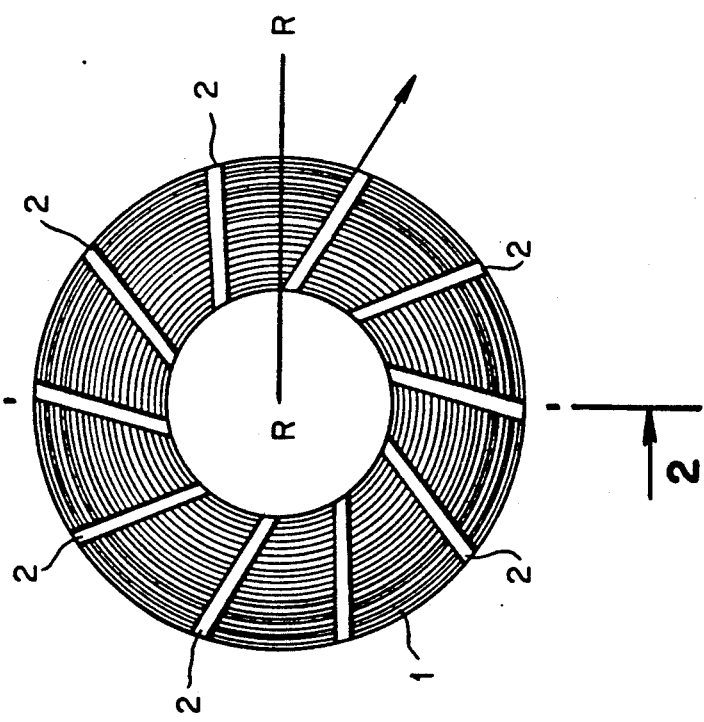
FIG. 1 is a front elevational view of the reusable wreath embodying the present invention.

Referring now, in detail, to the drawings and, in particular, to FIG. 1, there is illustrated a reusable wreath embodying the present invention. The wreath base 1 is made of a large number of vines, rods or stalks which are bound together circularly and shaped into a ring. A narrow strip of VELCRO ®2, a hook and loop fastener, is spirally wound about one segment of the ring at an angle other than in the radial direction R—R of the ring. VELCRO ® is a brand of fastening tape consisting of opposing pieces of fabric, one with a dense arrangement of tiny nylon hooks, and the other with a dense nylon pile, that interlock when pressed together. A number of windings of VELCRO ®2 should advance VELCRO ®2 along the ring, eventually returning to the starting point.

Figure 3:
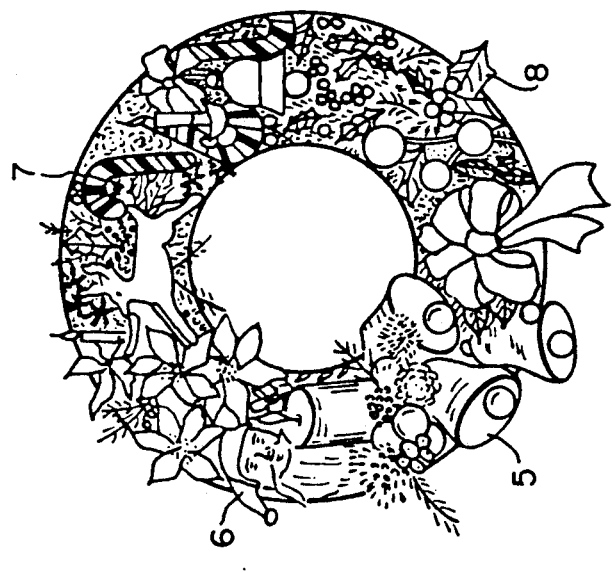
FIG. 3 is a front elevational view of the wreath with accessories attached.

Pursuant to the embodiment according to FIG. 3, a number of accessories or ornaments 5-8 are placed on VELCRO ®2 (not shown, for reasons of clarity). FIG. 3 represents one possible option for a Christmas wreath.

Alternatively, several strips of VELCRO ® could be wrapped around the ring in the radial direction, for example R—R. Additionally, a circular strip of VELCRO ® could be attached to the surface of the wreath base. Such a strip may require separate means to attach it to the wreath base, since it does not have the advantage of wrapping around the wreath base. The strip could be attached by glueing or stitching it to the wreath base. This method of attachment could also be utilized to attach small sections or patches of VELCRO ® to the wreath base to provide additional locations for ornaments, e.g., on the inner or outer edge of the wreath base. Also, if it was found that the longer strips of VELCRO ® are visible from beneath the ornaments, it would be possible to use small sections or patches exclusively.

Figure 2:
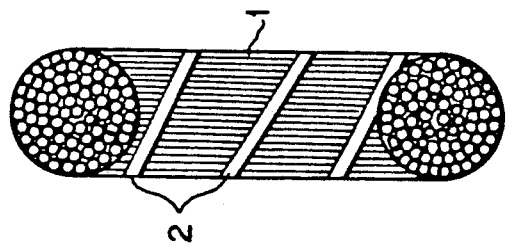
FIG. 2 is a cross sectional view taken along line II—II from FIG. 1.

As can be seen in FIG. 2, the wreath base 1 generally has a circular cross section.

Since all the accessories are removable, the invention provides an opportunity for the user to create his/her own designs, in other words, to be your own decorator. During the course of the year, many different embodiments could be displayed at a one time cost of the reusable wreath base.

It would be possible, in this respect, to purchase the wreath base and then each month receive a new set of accessories in the mail. Then only the actual placement of the accessories on the wreath base is required. For example, the monthly set could contain accessories such as the following:

January— snowmen, sleds, snowflakes, skiis, sweaters, scarves, mittens, hats, bears, New Year's baby, horns;

February— valentine hearts, babies breath, candy, love banners, flowers, picture frames;

March— shamrocks, top hats, clay pipes, walking sticks, harps;

April— rabbits, chicks, eggs, tulips, crocus, daffodils, Passover and Easter religious symbols;

May— flowers, books, candy, babies, Mother's Day cards, pictures;

June— American flags, men's ties, cars, slippers, bikes, boats, golf clubs, tennis rackets, graduation diplomas and hats, tassels, gavels;

July— American flags, cannons, ships, planes, drums, flutes, tri-cornered hats;

August— Various flowers, cars, boats, trains, planes, tents, chairs, beach umbrellas, golf clubs, rainbows;

September— American flags, school buses, books, pens, diaries.

October— Pumpkins, skeletons, witches, cornucopia, Indian corn, fall leaves and flowers;

November— Turkeys, pumpkins, leaves, pilgrims, Indians, horn-of-plenty, hands in prayer, acorns, pine cones, deer;

December— Santa, trees, holly, berries, bears, lambs, deer, trains, Nativity/Hanukah symbols, candles, angels, battery operated lights/stars;

Also, the wreath, for example, could come with three basic ribbon packages Nos. 1, 2 and 3.

Ribbon Package No. 1— red/white/blue;
Ribbon Package No. 2— Pastel Blue/Pink/Yellow
Ribbon Package No. 3— Orange/Brown/Green Each month the colors could be changed by choosing from the ribbon packages, for example, such as the following:

January— No. 1 red/white
February— No. 1 red + No. 2 pink
March— No. 1 white + No. 2 yellow + No. 3 green
April— No. 2 blue/pink/yellow
May— No. 1 white = No. 2 blue
June— No. 1 red/white/blue
July— No. 1 red/white/blue
August— No. 2 blue/yellow + No. 3 green
September— No. 1 red/white/blue
October— No. 3 orange/brown
November— No. 3 orange/brown
December— No. 1 red/white + No. 3 green The ribbons could be used with or without the accessories. The accessories could arrive each month and suggest which colors of ribbon to use with that set.

The wreath could be utilized in classrooms to encourage class participation regarding changes of season or national and religious holidays. The wreath also has application in commercial environments where frequent alteration of decorations is desired. Companies could have a monthly theme with possible daily and/or weekly additions and variations, such as a photo of "Employee of the Week" or "Employee of the Month," a "Goals Met" banner and to announce birthdays. Also, companies could use their own colors or logos on the wreath. Photos could be posted for recognition or for birthdays, anniversaries, etc. The wreath could operate as a visual calendar of memories in hospitals, nursing homes, etc.

Thus, while only one embodiment of the present invention has been shown and described, it is to be understood that many changes and modifications may be made thereunto without departing from the spirit and scope of the invention as defined in the appended claims.

What is claimed is:

1. A reusable wreath for year-round use comprising:
   a decorative wreath base which is generally ring shaped;
   means for removably connecting a plurality of accessories to said wreath base, including a hook element, and a loop element of a hook and loop fastener, one of said elements being formed as a narrow strip and spirally wound about said wreath base to maintain said wreath base in said ring shape, and the other said element being attached to said accessories; and
   a plurality of seasonably interchangeable accessories formed as sets, each set containing a coordinated group of accessories which together with said decorative wreath base depict a particular season.

2. The reusable wreath of claim 1, wherein said wreath base is made from a multiplicity of vines, rods or stalks which are bound together in a ring shape.

3. The reusable wreath of claim 2, wherein said accessories are decorative ribbons.

4. The reusable wreath of claim 2, wherein said accessories are miniature seasonal accessories.

5. The reusable wreath of claim 2, wherein said accessories are decorative ribbons and miniature seasonal accessories.

6. A reusable wreath for year-round use comprising:
   a decorative wreath base which is generally ring-shaped;
   a plurality of seasonably interchangeable accessories; and
   means for removably connecting said seasonably interchangeable accessories to said wreath base, including a hook element and a loop element of a hook and loop fastener, one of said elements being formed as a narrow band and wrapped around said wreath base for receiving said seasonably interchangeable accessories, said seasonably interchangeable accessories formed as sets, each set of seasonably interchangeable accessories depicting a particular season.

* * * * *